(12) United States Patent
Kakii

(10) Patent No.: US 10,484,362 B2
(45) Date of Patent: Nov. 19, 2019

(54) INFORMATION PROCESSING APPARATUS, ACCESS CONTROL METHOD, AND RECORDING MEDIUM STORING ACCESS CONTROL PROGRAM

(71) Applicant: Hiroshi Kakii, Tokyo (JP)

(72) Inventor: Hiroshi Kakii, Tokyo (JP)

(73) Assignee: Richoh Company, Ltd., Tokyo (JP)

( * ) Notice: Subject to any disclaimer, the term of this patent is extended or adjusted under 35 U.S.C. 154(b) by 94 days.

(21) Appl. No.: 15/345,673

(22) Filed: Nov. 8, 2016

(65) Prior Publication Data

US 2017/0155637 A1 Jun. 1, 2017

(30) Foreign Application Priority Data

Nov. 30, 2015 (JP) .................................. 2015-232673

(51) Int. Cl.
*H04L 29/06* (2006.01)
(52) U.S. Cl.
CPC .......... *H04L 63/083* (2013.01); *H04L 63/101* (2013.01); *H04L 63/105* (2013.01)
(58) Field of Classification Search
CPC ...... G06F 21/608; G06F 21/30; G06F 21/305; H04L 63/10; H04L 63/083; H04L 63/101; H04L 63/105
See application file for complete search history.

(56) References Cited

U.S. PATENT DOCUMENTS

2004/0184772 A1 9/2004 Kakii
2005/0188196 A1 8/2005 Kakii
2007/0124516 A1* 5/2007 Ohara .................... G06F 21/608
 710/62
2008/0178300 A1* 7/2008 Brown ................ G06F 21/6218
 726/29
2011/0265144 A1* 10/2011 Ikeda ..................... G06F 21/608
 726/3
2011/0296174 A1* 12/2011 Nakayama .......... H04L 63/0428
 713/162
2013/0070291 A1* 3/2013 Nishizaki .............. G06F 3/1205
 358/1.15
2013/0141749 A1* 6/2013 Chiba .................. H04N 1/4406
 358/1.14

(Continued)

FOREIGN PATENT DOCUMENTS

JP 10-187618 7/1998
JP 2005-182354 7/2005

*Primary Examiner* — Mohammad A Siddiqi

(74) *Attorney, Agent, or Firm* — Harness, Dickey & Pierce, P.L.C.

(57) ABSTRACT

An information processing apparatus includes multiple input interfaces each capable of receiving a user instruction to perform a management function provided by the information processing apparatus and circuitry that accepts, independently for each one of the multiple input interfaces, a selection that selects an option among multiple options regarding the access to the management function, the multiple options including an option that limits access to the management function and an option that allows access to the management function without authentication and controls access to the management function independently via each of the multiple input interfaces based on the option independently selected for each of the multiple input interfaces.

15 Claims, 9 Drawing Sheets

(56) References Cited

U.S. PATENT DOCUMENTS

| | | | |
|---|---|---|---|
| 2014/0020117 A1* | 1/2014 | Nagai | G06F 21/6218 |
| | | | 726/29 |
| 2014/0256407 A1* | 9/2014 | Graf | G07F 17/3204 |
| | | | 463/22 |
| 2015/0254735 A1 | 9/2015 | Kakii | |
| 2015/0334253 A1 | 11/2015 | Kakii | |
| 2016/0004851 A1* | 1/2016 | Suzuki | G06F 21/608 |
| | | | 726/7 |
| 2016/0044044 A1* | 2/2016 | Takamiya | H04L 63/105 |
| | | | 726/7 |
| 2016/0110550 A1 | 4/2016 | Kakii | |
| 2016/0299725 A1* | 10/2016 | Hosoda | H04W 12/08 |

* cited by examiner

INFORMATION PROCESSING APPARATUS, ACCESS CONTROL METHOD, AND RECORDING MEDIUM STORING ACCESS CONTROL PROGRAM

CROSS-REFERENCE TO RELATED APPLICATION

This patent application is based on and claims priority pursuant to 35 U.S.C. § 119(a) to Japanese Patent Application No. 2015-232673, filed on Nov. 30, 2015 in the Japan Patent Office, the entire disclosure of which is hereby incorporated by reference herein.

BACKGROUND

Technical Field

The present invention relates to an information processing apparatus, an access control method, and a non-transitory recording medium storing an access control program.

Background Art

In information processing apparatuses to be shared among a plurality of users such as multifunction peripherals (MFPs) and terminals, administrative settings may be configured via a control panel provided at the apparatus or through a network. Usually, the administrator is given with authority to access the information processing apparatuses. For this reasons, the administrator is expected to appropriately manage the administrator's password.

While the information processing apparatuses are protected from a security viewpoint, if the administrator forgets the password or the administrator changes without appropriate handover procedures, it would be difficult to access functions that are allowed only to the administrator. In some cases, it may be required to initialize the whole system etc.

SUMMARY

Example embodiments of the present invention provide a novel information processing apparatus that includes multiple input interfaces each capable of receiving a user instruction to perform a management function provided by the information processing apparatus and circuitry that accepts, independently for each one of the multiple input interfaces, a selection that selects an option among multiple options regarding the access to the management function, the multiple options including an option that limits access to the management function and an option that allows access to the management function without authentication and controls access to the management function independently via each of the multiple input interfaces based on the option independently selected for each of the multiple input interfaces.

Further example embodiments of the present invention provide an access control method and a non-transitory recording medium storing an access control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

Figure 1:
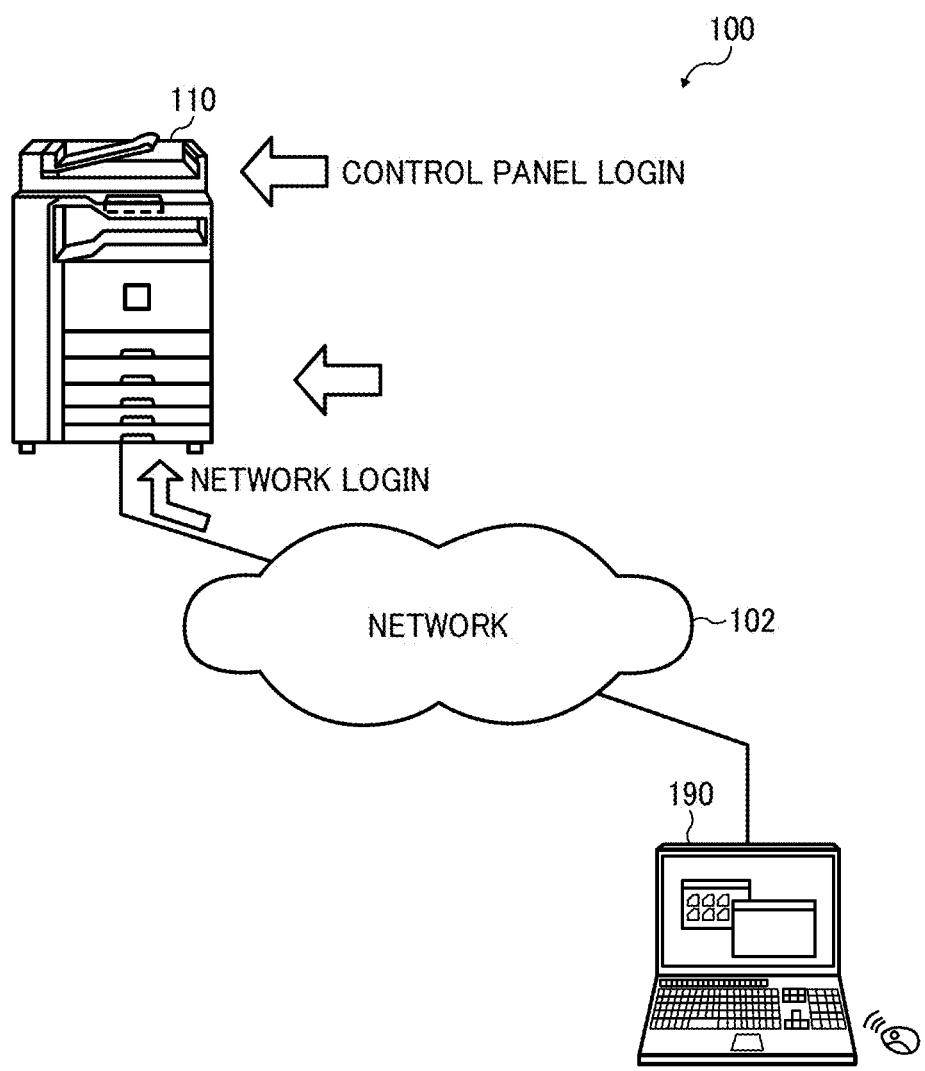
FIG. 1 is a diagram illustrating a use environment of a multifunctional peripheral (MFP) as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In the embodiments described below, a MFP 110 is described as an example of an information processing apparatus.

FIG. 1 is a diagram illustrating a use environment of a MFP in this embodiment. In a user environment 100 in FIG. 1, a MFP 110 and a client terminal 190 connected with each other via a network 102 are illustrated. The MFP 110 and the client terminal 190 are connected to be communicable with each other via the network 102. The network 102 may include a wired local area network, a wireless local area network, or a public network such as the Internet and a mobile communication network.

The MFP 110 is an apparatus that provides various image processing services such as printing, scanning, copying, and facsimile transmission etc. to users. The client terminal 190 may access the MFP 110 via the network 102 to request to print, scan, and transfer facsimile etc. as a user.

The MFP 110 further provides an administrative function for performing various management related to various image processing services. The MFP 110 includes a control panel. After logging in, an authorized administrator may access the various management functions provided by the MFP 110 via the control panel (i.e., control panel login). The MFP 110 further includes a network interface. After logging in, the administrator may remotely access the various management functions provided by the MFP 110 via the external client terminal 190 (i.e., network login).

Figure 2:
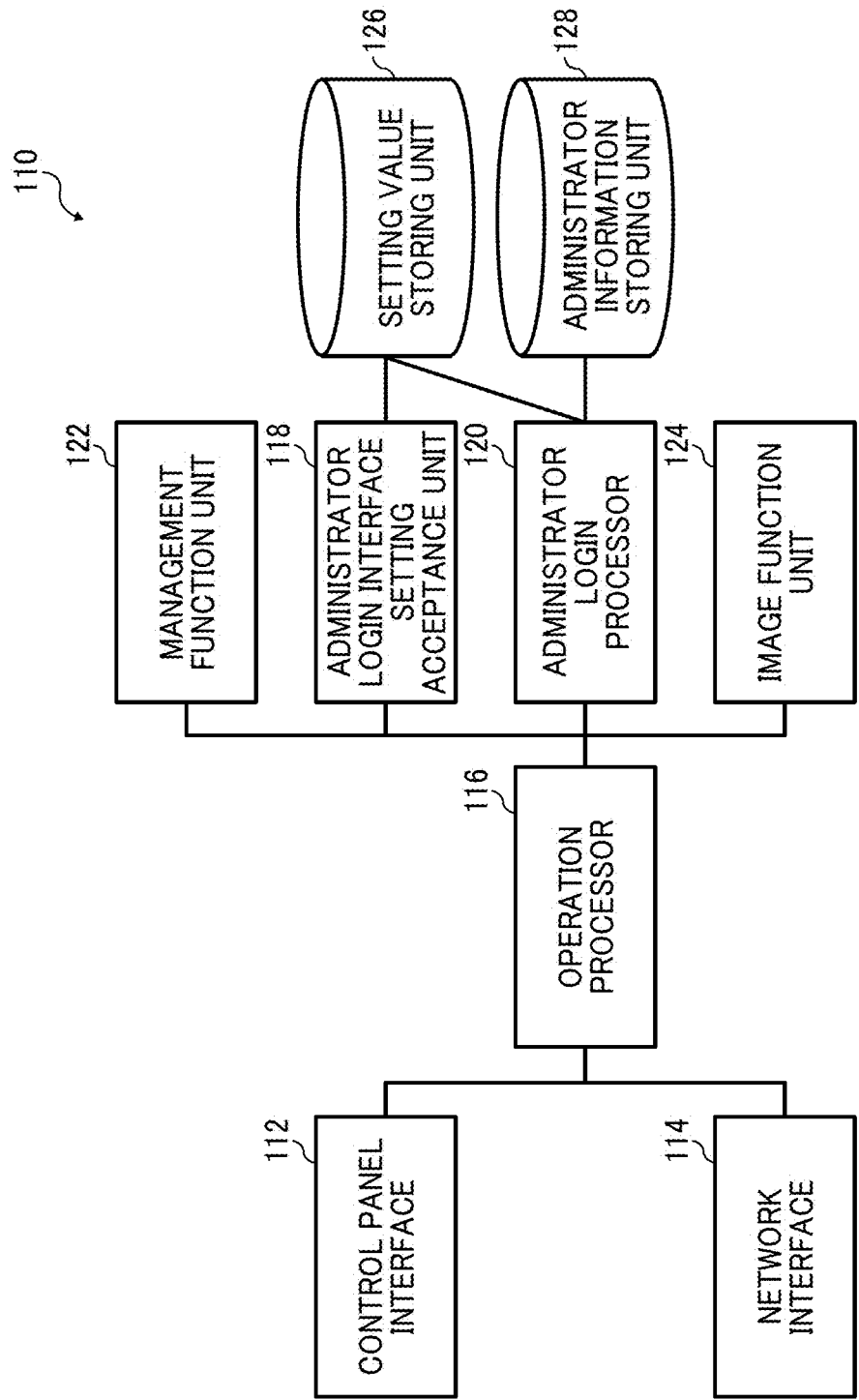
FIG. 2 is a diagram illustrating functional blocks of the MFP as an embodiment of the present invention.

FIG. 2 is a diagram illustrating functional blocks of the MFP in this embodiment. The MFP 110 in FIG. 2 includes a control panel interface 112, a network interface 114, an operation processor 116, an administrator login interface setting acceptance unit (hereinafter simply referred to as a setting acceptance unit) 118, an administrator login processor 120, a management function unit 122, an image function unit 124, a setting value storing unit 126, and an administrator information storing unit 128.

The control panel interface 112 is implemented by, for example, a control panel included in the MFP 110 that is provided with either one of a hardware key and a software key such as a touch panel etc. or both of the hardware key and the software key. The control panel interface 112 accepts user operation that is input with the hardware key and the touch panel. After being accepted, the user operation is transferred to the operation processor 116, and the control panel interface 112 displays a result of the user operation under control of the operation processor 116. The control panel interface 112 requests the administrator to directly access the MFP 110 while being physically present at the MFP 110 to operate the MFP 110.

The network interface 114 is an interface that enables the user to access the MFP 110 via the network 102. Typically, the network interface 114 includes a web server function and may accept user operation that is input with a web browser on the client terminal 190. The network interface 114 accepts access via the network 102. After being accepted, the user operation is transferred to the operation processor 116, and the network interface 114 displays a result of the user operation under control of the operation processor 116. The network interface 114 is an input interface that does not require the administrator to physically be at the MFP 110 to operate since the network interface 114 can be remotely accessed unlike the control panel interface 112 described above.

Hereinafter, the control panel interface 112 and the network interface 114 may be collectively referred to as an input interface in some cases.

The operation processor 116 performs operation on data that is input from the input interfaces 112 and 114 and transfers the processed data to one or more of the functional units 118 to 124. In accordance with user operation performed on the input interfaces 112 and 114, the operation processor 116 calls the setting acceptance unit 118, the administrator login processor 120, the management function unit 122 and the image function unit 124.

The management function unit 122 provides various management functions related to various image processing services such as user management, document management, network configuration management, and apparatus management. The management function unit 122 accepts operations on various management functions from the administrator, and depending on a role and authority permitted to the administrator, the management function unit 122 performs the operation if the requested operation is allowed.

The administrator login processor 120 identifies and authorizes the administrator in the MFP 110 and determines whether or not the identified and authorized administrator is allowed to have access to the various management functions provided by the management function unit 122. The administrator information storing unit 128 stores account information for each administrator who is provided administrative authority for the MFP 110. In the description below, it is assumed that identification information and authentication information such as an administrator's user ID etc. is pre-registered in the MFP 110. The administrator login processor 120 refers to the administrator information storing unit 128 and checks legitimacy of the administrator who requests to log in. After confirming the legitimacy, the administrator login processor 120 allows the administrator to access various management functions provided by the management function unit 122.

Figure 3A:
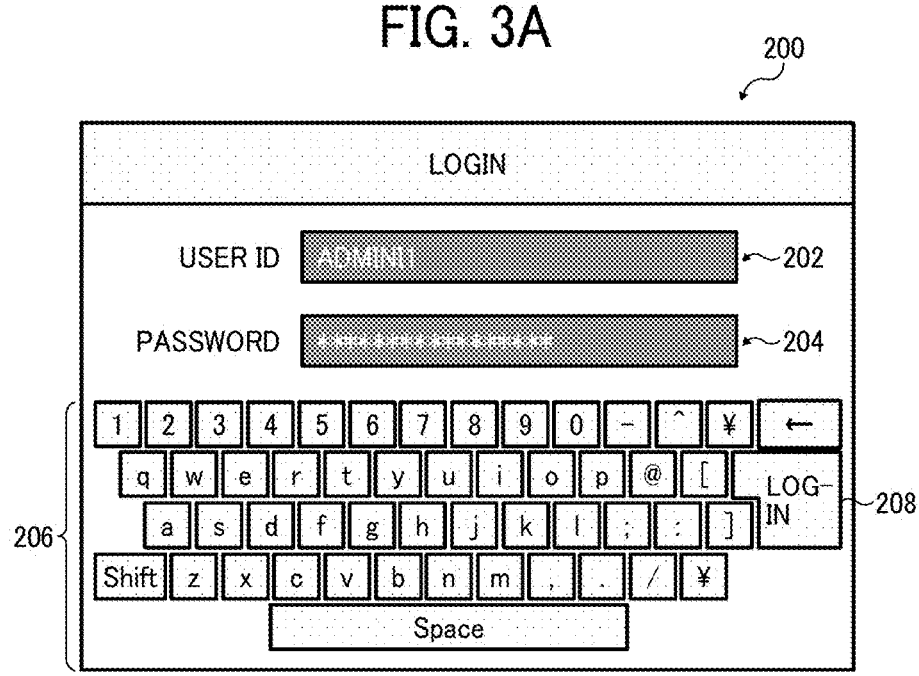
FIGS. 3A and 3B are diagrams illustrating a login screen used for multiple input interfaces provided by the MFP as an embodiment of the present invention.
Figure 3B:
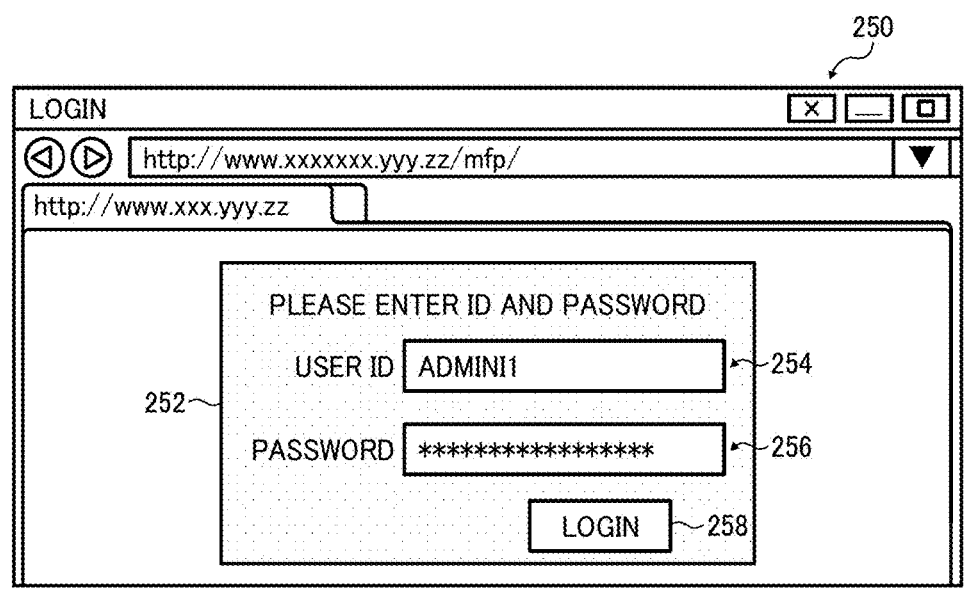

FIGS. 3A and 3B are diagrams illustrating a login screen used for multiple input interfaces provided by the MFP 110 in this embodiment. FIG. 3A is a diagram illustrating a login screen 200 displayed by the control panel interface 112 on a display of the control panel. FIG. 3B is a diagram illustrating a login screen 252, which is displayed by the network interface 114 on a display of the client terminal 190 as a part of a browser screen 250.

The login screens 200 and 252 include graphical user interface (GUI) parts 202 and 254, respectively, to each input identification information such as the administrator's user ID etc. and GUI parts 204 and 256, respectively, to each input authentication information such as the password etc. The login screens 200 and 252 further include login keys 208 and 258, respectively, to each accept a command to request for authentication. The login screen 200 displayed on the display of the control panel illustrated in FIG. 3A further includes a software keyboard 206.

As described above, the administrator is normally required to log in to access the various management functions provided by the management function unit 122. In some cases, the administrator password becomes unknown if the administrator forgets the password or a person in charge is replaced without sufficient handover. In such case, as described before, it may be required to perform initialize the whole system etc. In other cases, the administrator is not designated in a first place, or the factory default password is not modified. In such case, if the default password is generally known, even a non-administrative user may easily access the system.

Moreover, the degree of security threat in login via the control panel interface 112 and the network interface 114 depends on installation environment of the MFP 110 etc. For example, if the MFP 110 is opened to the public on the Internet, for login via the network interface 114, attacks from the general public can be expected, thus increasing the security threat. By contrast, if the MFP 110 is only connected to a specific local area network such as the intranet, users who may access the MFP 110 are limited and it may be expected that both the control panel interface 112 and the network interface are relatively safe in some cases. If the MFP 110 is located at a public space, the general public may access the control panel interface 112. Therefore, even the control panel interface 112 may not be safe in some cases.

As described above, the security threat for each input interface varies depending on the installation environment of the MFP 110. Regardless of the above description, if login by password authentication is required for access to the management function via all input interfaces 112 and 114 without exception, it is highly possible to cause the issue described before in case the administrator password becomes unknown.

To cope with this issue, in accessing the management function provided by the MFP 110 via the multiple input interface 112 and 114, the MFP 110 in this embodiment allows an option be independently selected among multiple options. The multiple options include an option to limit access to the management function and an option to allow access to the management function without authentication. Preferably, the option to limit access to the management function further includes multiple options, such as an option to allow the administrator to access to the management function via authentication and an option to reject access to the management function via a corresponding input interface regardless of authentication. In addition, based on the selection among these options, the MFP 110 controls access to the management function via each of the multiple input interfaces 112 independently.

As described above, it becomes possible to control access based on the selection among multiple choices including the choice that allows to access the management function without authentication, independently for each of the multiple input interfaces. By providing the choice that limits access to the management function on one hand and allows to access the management function without authentication on the other hand, it is possible to retain a route that can access the management function even if the information required for access to the management function becomes unknown.

The configuration function related to access to the management function in this embodiment is described below with reference to FIG. 2. The setting acceptance unit 118 in FIG. 2 accepts a selection among multiple choices that independently rules whether or not to allow access to the management function in accessing the management function provided by the management function unit 122 via each of the multiple input interfaces 112 and 114. In a specific embodiment, the setting acceptance unit 118 may accept various settings related to the administrator login interface as the factory initial settings of the MFP 110. The setting acceptance unit 118 corresponds to a selection acceptance unit in this embodiment.

In this embodiment, the presented multiple choices may include a choice that allows the administrator to access the management function via the authentication only (i.e., login-allowed), a choice that rejects access to the management function via a corresponding input interface regardless of the authentication (i.e., login-disallowed), and a choice that allows to access to the management function without authentication (i.e., no-login-required).

The setting value storing unit 126 stores setting values for various setting items to control operations of the MFP 110. In this embodiment, the setting items include setting items corresponding to each of the input interfaces described above and a setting value indicating a selected choice.

Figure 4:
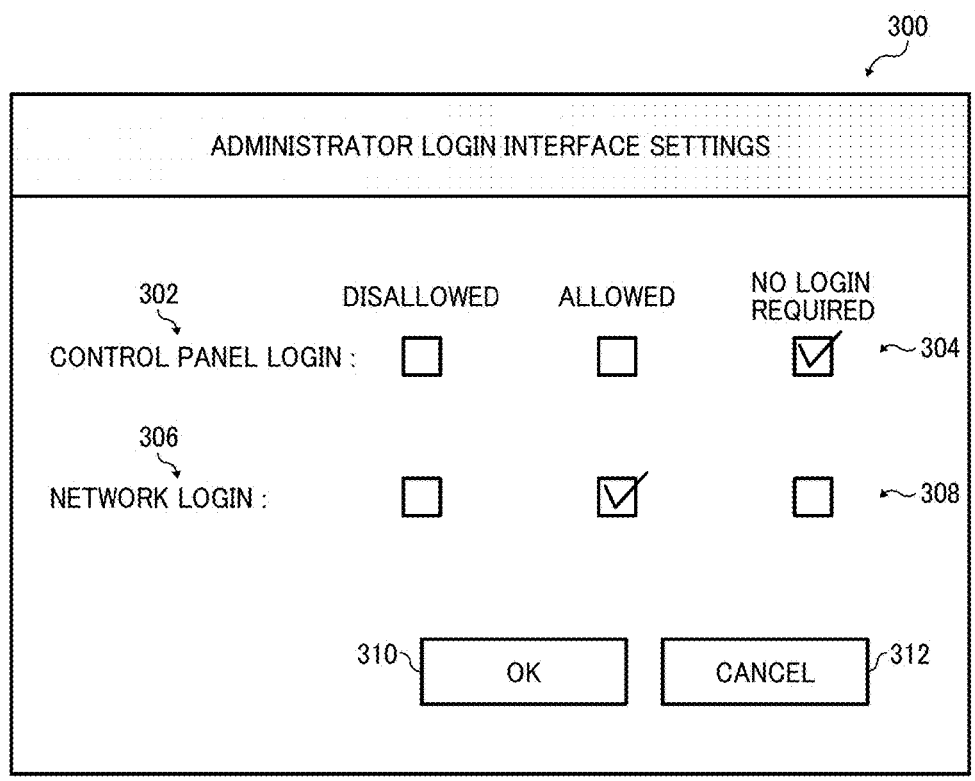
FIG. 4 is a diagram illustrating a screen of configuring an interface for administrator login provided by the MFP as an embodiment of the present invention.

FIG. 4 is a diagram illustrating a screen for configuring an administrator login interface to be displayed by the MFP in this embodiment. For example, an administrator login interface configuration screen 300 in FIG. 4 is displayed on a display of the control panel included in the MFP 110 during an initial setting wizard when the MFP 110 boots up for the first time. Otherwise, after being called at arbitrary timing after the initial configuration, the administrator login interface configuration screen 300 is displayed on the display of the control panel included in the MFP 110 or a display of the client terminal 190 via the network 102.

The administrator login interface configuration screen 300 includes text 302 and 306 indicating target input interfaces, check boxes 304 and 308 for selecting a predetermined choice for the corresponding input interface among multiple choices, an OK button 310 that, when selected, reflects the current content of settings, and a cancel button 312 that discards the current content of settings and returns to the previous configuration screen.

On the administrator login interface configuration screen 300 in FIG. 4, the administrator may select a choice among multiple choices independently for each of the input interfaces, in accessing the management function via the multiple input interfaces 112 and 114. Based on an analysis of security threat on what risk is included in the operating environment preliminarily performed, the administrator may determine which choice is to be selected. In this embodiment, there are three choices for each of the two interfaces 112 and 114. Therefore, nine ways of modes or combinations may be considered. While it is not particularly limited, in the below description, the administrator password is common between login via the control panel interface 112 and login via the network interface 114, and the administrator password has already been set. The nine ways of modes are described below.

Mode 1

In the mode 1, login via the control panel interface 112 is allowed, and login via the network interface 114 is also allowed. In this mode 1, in login via the control panel or the network 102, the set administrator password is valid, and it is not possible to log in without using the password. The mode 1 is appropriate when it is necessary to log in via both the control panel and the network 102 and a certain level of security threat is presumed in both ways.

Mode 2

In the mode 2, login via the control panel interface 112 is allowed, but login via the network interface 114 is disallowed. In this mode 1, in login via the control panel, the set administrator password is valid, and it is not possible to log in without using the password. On the other hand, via the network 102, an interface that may access the management function is not provided, or an error is always returned when it is requested to log in. The mode 2 is appropriate when it is required to log in via the control panel and a certain level of security threat is presumed, but it is not required to log in via the network 102, or security threat via the network 102 is relatively high.

Mode 3

In the mode 3, login via the control panel interface 112 is allowed, and login via the network interface 114 is "no-login-required". In this mode 3, in login via the control panel, the set administrator password is valid, and it is not possible to log in not using the password. By contrast, via the network 102, even if the administrator password is set, the user may access the management function without authentication. The mode 3 is appropriate when it is necessary to log in via the control panel, a certain level of security threat is presumed, and no threat from the network 102 is presumed.

Mode 4

In the mode 4, login via the control panel interface 112 is not allowed, and login via the network interface 114 is allowed. In this mode 4, via the control panel, an interface that may access the management function is not provided, or an error is always returned when it is requested to log in. By contrast, in login via network 102, the set administrator password is valid, and it is not possible to log in without using the password. The mode 4 is appropriate when it is not required to log in via the control panel or a certain level of security threat from the control panel is presumed, and it is required to log in via the network 102, and presumed security threat via the network 102 is relatively high.

Mode 5

In the mode 5, login via the control panel interface 112 is not allowed, and login via the network interface 114 is not allowed either. In this mode 5, via the control panel and the network 102, an interface that may access the management function is not provided, or an error is always returned when it is requested to log in. The mode 5 is appropriate when the MFP 110 may not be accessed before the MFP 110 is scrapped.

Mode 6

In the mode 6, login via the control panel interface 112 is not allowed, and login via the network interface 114 is "no-login-required". In this mode 6, via the control panel, an interface that may access the management function is not provided, or an error is always returned when it is requested to log in. By contrast, via the network 102, even if the administrator password is set, the user may access the management function without authentication. The mode 6 is appropriate when security threat via the network 102 is not presumed, it is not required to log in via the control panel, or security threat via the control panel is relatively high.

Mode 7

In the mode 7, login via the control panel interface 112 is "no-login-required", and login via the network interface 114 is allowed. In this mode 7, via the control panel, even if the administrator password is set, the user may access the management function without authentication. By contrast, in login via network 102, the set administrator password is valid, and it is not possible to log in without using the password. The mode 7 is appropriate when no threat from the network 102 is presumed and a certain level of security threat via the network 102 is presumed.

Mode 8

In the mode 8, login via the control panel interface 112 is "no-login-required", and login via the network interface 114 is not allowed. In this mode 8, via the control panel, even if the administrator password is set, the user may access the management function without authentication. On the other hand, via the network 102, an interface that may access the management function is not provided, or an error is always returned when it is requested to log in. The mode 8 is appropriate when security threat via the control panel is not presumed, it is not required to log in via the network 102, or security threat via the network 102 is relatively high.

Mode 9

In the mode 9, login via the control panel interface 112 is "no-login-required", and login via the network interface 114 is also "no-login-required". In this mode 9, via both the control panel and the network 102, even if the administrator password is set, the user may access the management function without authentication. The mode 9 is appropriate when security threat via both the control panel and the network 102 is not presumed. For example, the mode 9 is appropriate if only personal users are presumed in a closed environment.

The nine modes are described above. It is not required that all modes are selectable, and it is required that some multiple modes are selectable. In a preferable embodiment, at least one input interface such as the mode 3, mode 6, mode 7, or mode 8 accessible without login is specified, and modes inaccessible from other input interfaces are provided as selectable modes.

In the description below, FIG. 2 is referred again. The administrator login processor 120 controls access to the management function via each of the multiple input interfaces 112 and 114 independently based on a setting value configured in the setting value storing unit 126. More specifically, if the choice "login is allowed" is set to the setting value of the input interface corresponding to the login request, the administrator login processor 120 allows or rejects login based on the administrator information registered in the administrator information storing unit 128. By contrast, if the choice "no-login-required" is set to the setting value of the input interface corresponding to the login request, the administrator login processor 120 may allow login unconditionally. Furthermore, if the choice "login is not allowed" is set to the setting value of the input interface corresponding to the login request, the administrator login processor 120 may reject login unconditionally.

In case of allowing login, the administrator login processor 120 may specify a role or authority applied to the administrator. The administrator login processor 120 operates as a controller in this embodiment.

The image function unit 124 provides various image functions implemented in the MFP 110 such as copy function, print function, scan function, and facsimile transfer function etc. The image function unit 124 accepts operations on various image functions from a user, and depending on a role and authority given to the user, the image function unit 122 performs the operation if the requested operation is allowed.

In this embodiment, the MFP 110 is described as an example of the information processing apparatus. However, the information processing apparatus is not limited to the MFP 110 described in this embodiment. For example, whatever information processing apparatuses including the management function, requiring predetermined authentication in accessing the management function, and including multiple input interfaces such as an image forming apparatus such as a laser printer, an image scanning apparatus such as a scanner, an image communication apparatus such as a facsimile machine, an image projecting apparatus such as a projector, an image displaying apparatus, a server apparatus, an remote conference terminal, an electronic whiteboard, a portable information terminal, an image capturing apparatus, a vending machine, a medical equipment, a power supply apparatus, an air-conditioning system, a measuring apparatus such as gas, water, and electricity, and a network home appliance such as a refrigerator and a washing machine may be adopted.

Figure 5:
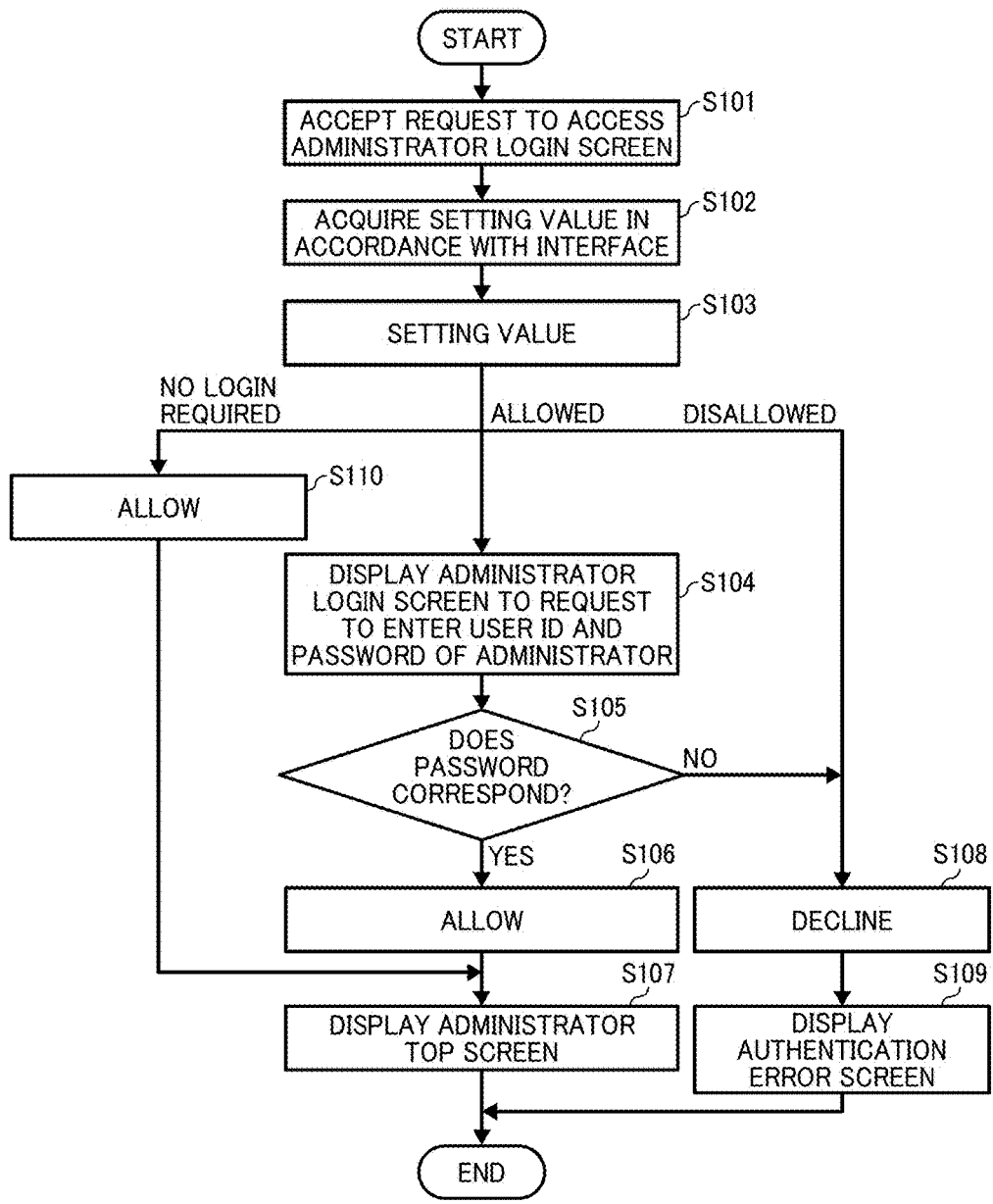
FIG. 5 is a flowchart illustrating an operation of processing login by the administrator, performed by the MFP, as an embodiment of the present invention.

An administrator login operation in the MFP in this embodiment is described below in detail with reference to FIG. 5. FIG. 5 is a flowchart illustrating an operation of processing login of administrator performed by the MFP in this embodiment. The operation in FIG. 5 starts after requesting to access the administrator login screen by user operation. Here, the administrator login processor 120 in FIG. 2 performs the operation in FIG. 5.

In S101, the MFP 110 accepts the request to access the administrator login screen. The administrator login processor 120 accepts notification of information indicating a type of the interface that is used (i.e., either the control panel interface or the network interface) from the interface 112 or 114 that accepts the request to access via the operation processor 116. In S102, the MFP 110 acquires the setting value corresponding to the input interface that accepts the request to access from the setting value storing unit 126. In S103, the MFP 110 branches the operation in accordance with the acquired setting value.

In case of determining that the acquired setting value corresponds to "login is allowed" in S103, the operation proceeds to S104. In S104, the MFP 110 displays the administrator login screen prompting to input the user ID and password of the administrator to acquire the input user ID and password. In S105, the MFP 110 acquires the administrator information corresponding to the user ID input via the administrator login screen from the administrator information storing unit 128 and determines whether or not the input password corresponds to the password included in the acquired administrator information. If it is determined that the passwords correspond (YES in S105), the operation proceeds to S106. In S106, the MFP 110 determines that the authentication is "allowed". In S107, a menu screen for the corresponding administrator is displayed, and the operation ends. Subsequently, the login administrator my access the management function.

By contrast, if it is determined that the passwords do not correspond (NO in S105), the operation proceeds to S108. In S108, the MFP 110 determines that the authentication is "rejected". In S109, an authentication error screen is displayed, and the operation ends.

In case of determining that the acquired setting value corresponds to "login is not allowed" in S103, the operation proceeds to S108. Likewise, in S108, the MFP 110 determines that the authentication is "rejected". In S109, an authentication error screen is displayed, and the operation ends. In other embodiments, instead of displaying a screen reporting that there is an error in the authentication, a screen reporting that access itself is not allowed may be displayed.

Furthermore, in case of determining that the acquired setting value corresponds to "login is not required" in S103, the operation proceeds to S110. In S110, the MFP 110 determines that the authentication is "allowed". In S107, a top screen for the corresponding administrator is displayed, and the operation ends.

As described above, after accepting the request to access the management function via either one of the multiple input interfaces 112 and 114, the administrator login processor 120 may determine whether or not it is allowed to access the management function based on the selection of the choices regarding the input interface corresponding to the access request.

Figure 6:
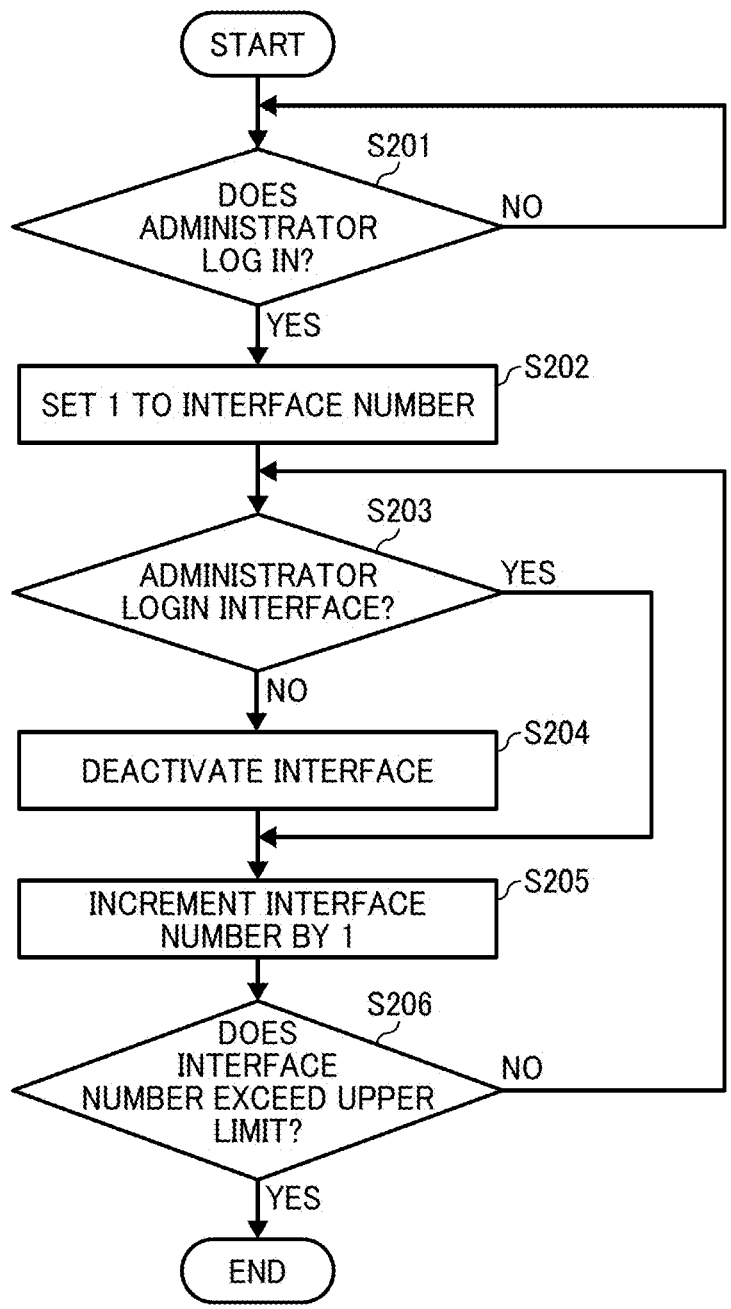
FIG. 6 is a flowchart illustrating an operation of processing login of the administrator, performed by the MFP as an embodiment of the present invention.

Operations when an administrator logs in and logs out in this embodiment are described below with reference to FIGS. 6 and 7. FIG. 6 is a flowchart illustrating an operation of processing login of the administrator performed by the MFP 110 in this embodiment. Here, the administrator login processor 120 in FIG. 2 performs the operation in FIG. 6.

The operation illustrated in FIG. 6 starts. In S201, the MFP 110 waits for detecting that an administrator logs in and repeats S201 until the MFP 110 detects that an administrator logs in. If it is detected that an administrator logs in (YES in S201), the operation proceeds to S202. In S202, the MFP 110 initializes an interface number processed currently. In this case, the interface numbers are allotted to each of the input interfaces 112 and 114. For example, integer values beginning from number 1 are allotted to the interface numbers sequentially. For example, in this embodiment, "1" is allocated to the control panel interface, and "2" is allocated to the network interface.

In S203, the MFP 110 determines whether or not the interface number processed currently corresponds to the input interface that the administrator logs in. If it is determined that the interface number does not correspond to the input interface that the administrator logs in (NO in S203), the operation proceeds to S204. In S204, the MFP 110 deactivates the input interface corresponding to the interface number processed currently, and the operation proceeds to S205. By contrast, if it is determined that the interface number corresponds to the input interface that the administrator logs in (YES in S203), the operation proceeds to S205 directly.

In S205, the MFP 110 increments the interface number processed currently by one, and it is determined whether or not the interface number processed currently exceeds an upper limit in S206. If it is determined that the interface number processed currently does not exceed the upper limit (NO in S206), the operation in S203 is repeated, and a next input interface is processed. By contrast, if it is determined that the interface number processed currently exceeds the upper limit (YES in S206), the operation proceeds to S207, and the operation ends.

Figure 7:
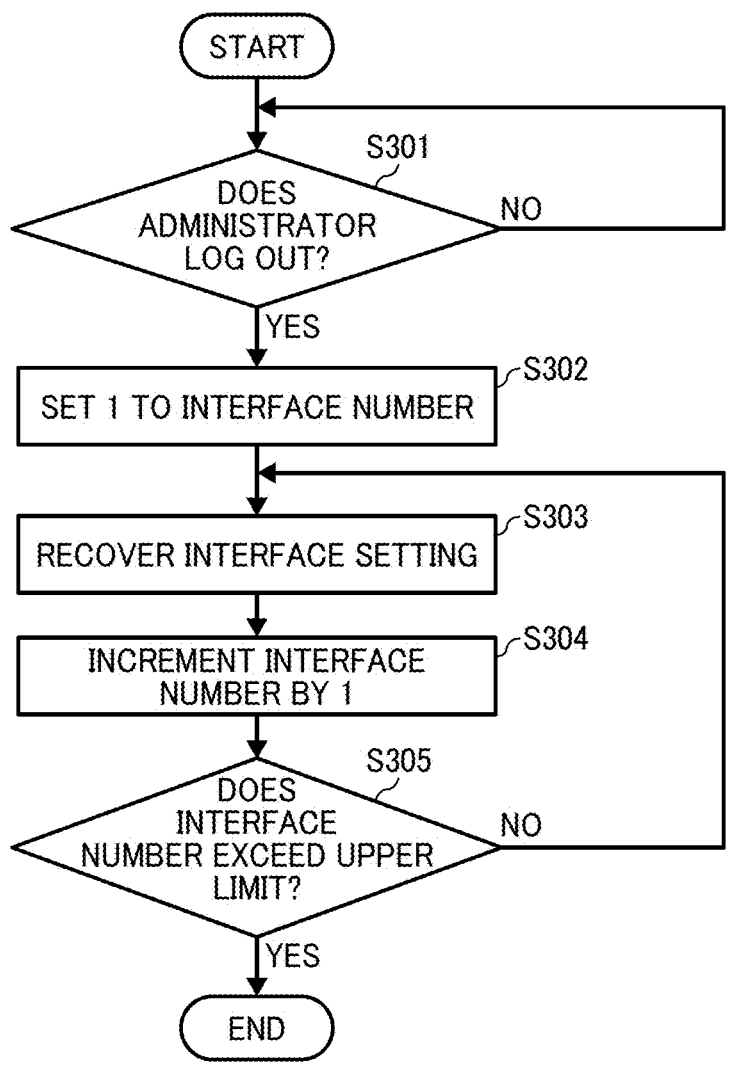
FIG. 7 is a flowchart illustrating an operation of processing logout of the administrator, performed by the MFP as an embodiment of the present invention.

FIG. 7 is a flowchart illustrating an operation of processing logout of the administrator performed by the MFP 110 in this embodiment. Here, the administrator login processor 120 in FIG. 2 performs the operation in FIG. 7.

In S301, the MFP 110 waits until the MFP 110 detects an administrator to log out and repeats S301 until the MFP 110 detects that an administrator logs out. If it is detected that an administrator logs out (YES in S301), the operation proceeds to S302. Here, the administrator login processor 120 in FIG. 2 performs the operation in FIG. 7.

In S302, the MFP 110 initializes an interface number processed currently. In S303, the MFP 110 reactivates the input interface corresponding to the interface number processed currently. In this case, "reactivation" means that the setting value is put back to its original setting value. In S304, the MFP 110 increments the interface number processed currently by one, and it is determined whether or not the interface number processed currently exceeds an upper limit in S305. If it is determined that the interface number processed currently does not exceed the upper limit (NO in S305), the operation in S303 is repeated, and a next input interface is processed. By contrast, if it is determined that the interface number processed currently exceeds the upper limit (YES in S305), the operation proceeds to S306, and the operation ends.

As described above, in response to detecting that the administrator logs in the management function via any one of the multiple input interfaces, input interfaces other than the input interface that the administrator logs in are deactivated. In addition, in response to detecting that the administrator logs out from the management function, the input interfaces are reactivated. By configuring the apparatus as described above, access from input interfaces other than the input interface that the administrator logs in may be excluded, and security may be improved.

Figure 8:
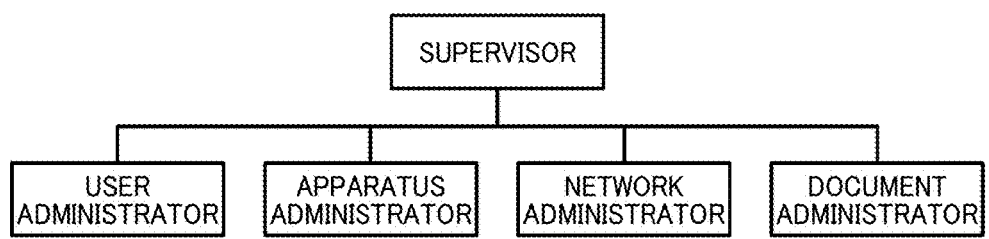
FIG. 8 is a diagram illustrating a hierarchical structure of administrators as an embodiment of the present invention.

In the embodiments described above, types of the administrator are not described particularly. However, in some specific embodiments, multiple types of the administrator may exist. FIG. 8 is a diagram illustrating a hierarchical structure of administrators in this embodiment. For example, as illustrated in FIG. 8, one or more lower level administrators to whom specific management functions (e.g., user management, apparatus management, network management, and document management) are given and an upper level administrator to whom authority to register and deregister the one or more lower level administrators is given (i.e., a supervisor) are configured in some cases.

In this case, preferably, an administrator to be controlled the administrator login may be the upper level administrator (supervisor) to whom the authority to register and deregister the lower level administrator is given. As a result, it is possible to operate the apparatus by not limiting that the normal administrators use the login interface. The upper level administrator (supervisor) may delete passwords for each administrator and set up passwords for each administrator newly. As a result, by selecting modes such as the mode 3, mode 6, mode 7, and mode 8, even if the password of the upper level administrator becomes unknown, it is possible to access the management function without login authentication via any one of the input interfaces. Consequently, it is possible to continue the operation without initialization. That is, in order to recover from forgetting the password or limit interfaces that might be attacked, it is possible to remain the operation for the normal administrators unchanged and apply to the supervisor only.

Figure 9:
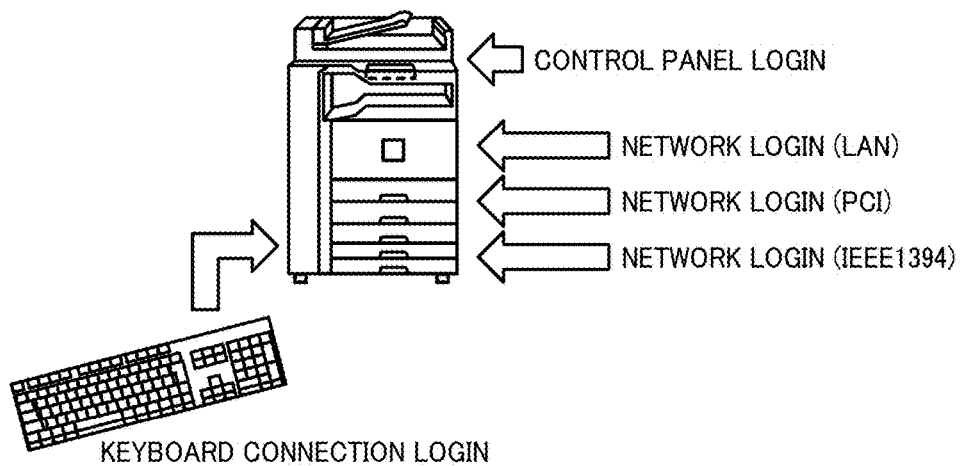
FIG. 9 is a diagram illustrating a use environment of a MFP as an embodiment of the present invention.

FIG. 9 is a diagram illustrating a use environment of a MFP in this embodiment. In the use environment illustrated in FIG. 1, there are two input interfaces, the control panel interface 112 and the network interface 114. By contrast, in the embodiment illustrated in FIG. 9, the network login is further segmented, and a new login route via a keyboard connected directly is further added.

More specifically, in FIG. 9, in addition to the two input interfaces illustrated in FIG. 1, a login route using a keyboard connected via USB directly, a login route using a Peripheral Component Interconnect (PCI) interface, and a login route using an Institute of Electrical and Electronic Engineers (IEEE) 1394 interface are illustrated. In this use environment, on the configuration screen 300 provided by the setting acceptance unit 118, in addition to three options corresponding to each of the control panel interface 112 and the network interface 114, three options corresponding to each of the keyboard, PCI, and IEEE 1394 are displayed.

Figure 10:
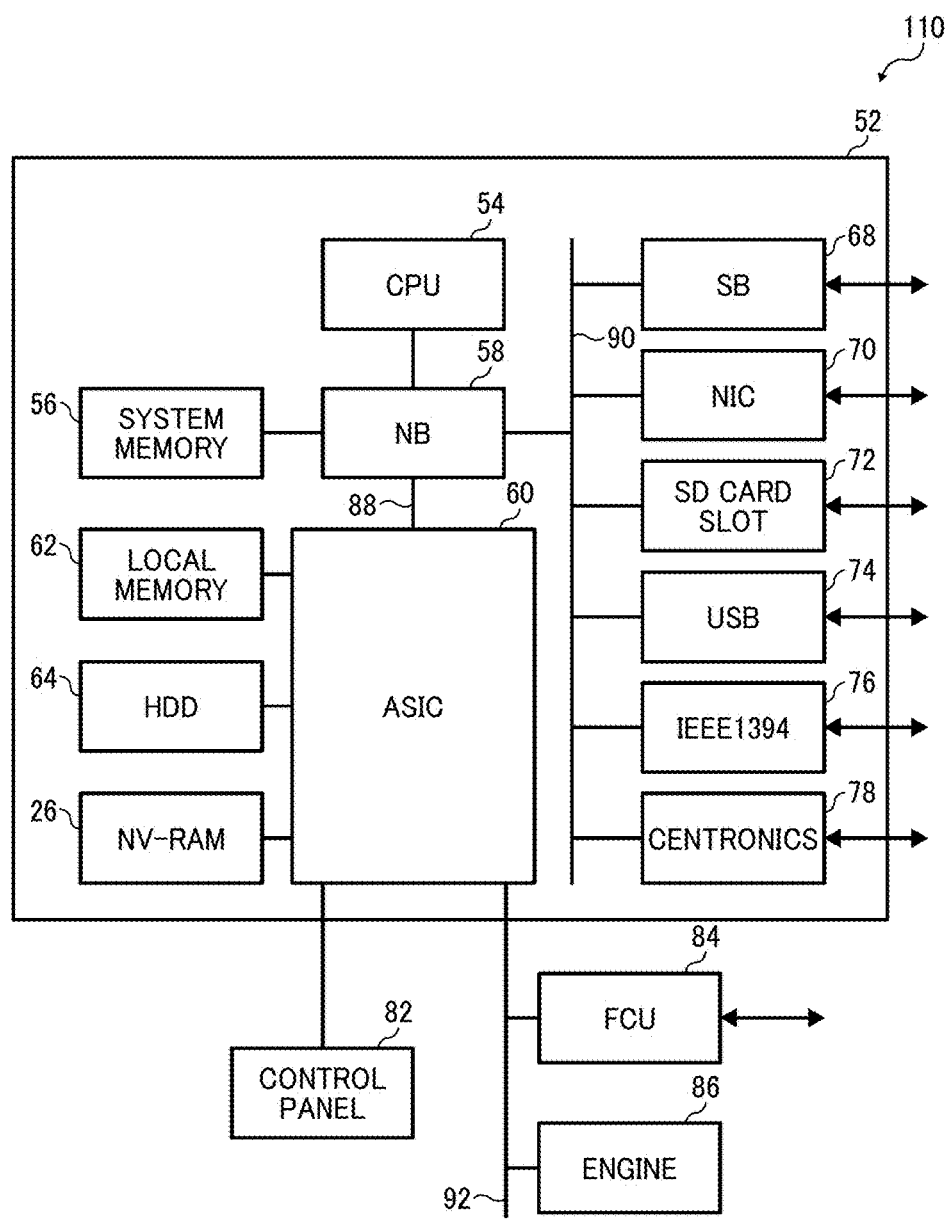
FIG. 10 is a diagram illustrating a hardware configuration of the MFP as an embodiment of the present invention.

The hardware configuration of the MFP 110 is described below with reference to FIG. 10. FIG. 10 is a diagram illustrating a hardware configuration of the MFP in this embodiment. The MFP 110 includes a controller 52, a control panel 82, a facsimile control unit (FCU) 84, and an engine 86. The controller 52 includes a CPU 54, a Northbridge (NB) 58, an ASIC 60 connected to the CPU 54 via the NB 58, and a system memory 56. The ASIC 60 processes various images, and the ASIC 60 is connected to the NB 58 via an Accelerated Graphic Port (AGP) 88. The system memory 56 is used as a memory for drawing images etc.

The ASIC 60 is connected to a local memory 62, a hard disk drive (HDD) 64, and a nonvolatile memory (e.g., a flash memory etc.) 66 (hereinafter referred to as "NVRAM 66"). The local memory 62 is used as an image buffer for copying and a code buffer, and the HDD 64 is a storage device that stores image data, document data, programs, font data, and form data etc. The NVRAM 66 stores programs for controlling the MFP 110, various system information, and various setting information.

The controller 52 further includes a Southbridge (SB) 68, a network interface card (NIC) 70, a Secure Digital (SD) card slot 72, a USB interface 74, an IEEE 1394 interface 76, and a Centronics interface 78, and those components are connected to the NB 58 via a PCI bus 90. The SB 68 is a bridge that connects a ROM and PCI bus peripheral devices etc. to the NB 58. The NIC 70 is an interface that connects the MFP 110 to the network 102 such as the Internet and a LAN etc., and the NIC 70 accepts commands and requests via the network. The NIC 70 constructs the network interface 114 illustrated in FIG. 2. The SD card slot 72 mounts a SD card detachably. The USB interface 74, the IEEE 1394 interface 76, and the Centronics interface 78 are interfaces compatible with each specification (standard) and accepts a print job etc.

The control panel 82 is connected to the ASIC 60 in the controller 52 to accept various input commands and requests by user operation and provide a user interface for displaying a screen. The control panel 82 constructs the control panel interface 112 illustrated in FIG. 2. The FCU 84 and the engine 86 are connected to the ASIC 60 via the PCI bus 92. The FCU 84 performs communication methods compatible with facsimile communication specifications (standards) such as G3 and G4 etc. After accepting a request for print and a request for scan issued by an application, the engine 86 performs an image forming process and an image scanning process. The engine 86 constructs the scanner and the printer.

The MFP 110 in this embodiment reads control programs from the HDD 64 and NVRAM 66 and expands the read control program into a work area provided by the system memory 56 and the local memory 62 to implement the functional units (functional components) and processes described above under control of the CPU 54. In the embodiments described above, all functional units are implemented on a single MFP 110. However, these functional units may be implemented using the MFP 110 and other computer apparatuses decentralizedly to construct an information processing system.

As described in the above embodiments, the information processing apparatus that may leave the door open to access the administrative function even if the information required for accessing the administrative function becomes unknown by enabling to control access on each of multiple input interfaces independently and providing an option for limiting access to the administrative function by one input interface and allowing access to the administrative function without authentication by another input interface.

As a result, in accordance with security threat in the use environment, it is possible to control access by designating an input interface that the administrator password is not required or designating a deactivated (i.e., the user is not allowed to log in) login interface. Depending on the initialization, it is possible to own the administrator authorization coping with the security threat, and it is possible to continue operating the MFP without initializing even if the password becomes unknown. In addition, an option of disallowing login is provided, and it is possible to cope with a certain amount of threat even if the password is leaked.

In the embodiments described above, a novel information processing apparatus that may provide a choice that limits access to the management function on one hand and allows to access a management function without authentication on the other hand and retain a route that can access the management function even if the information required to access the management function becomes unknown is provided.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

In the embodiments described above, a novel image forming apparatus that may reduce a burden on the administrator and deterring users from transferring information to the other apparatus is provided.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
multiple input interfaces each capable of receiving a user instruction to perform a management function provided by the information processing apparatus, the multiple input interfaces including a first input interface and a second input interface, the first input interface being a control panel and the second input interface configured to interface with a networked device; and
circuitry configured to,
display, on the control panel, an administrator login interface configuration screen such that the administrator login interface configuration screen simultaneously displays multiple access settings corresponding to each of the multiple input interfaces on a same screen, the multiple access settings including, for each of the multiple input interfaces, an open-access setting, a login-required setting, and a login-disabled setting,
determine, independently for each one of the multiple input interfaces, a set access setting from among the multiple access settings based on input received from an administrator in response to the multiple access settings for each of the multiple input interfaces simultaneously displayed on the same screen; and
control access to the management function independently via each of the multiple input interfaces based on the input independently selected for each of the multiple input interfaces such that the circuitry is configured to,
allow the access to the management function via a respective one of the multiple input interfaces irrespective of an authentication, in response to the set access setting for the respective one of the multiple input interfaces being the open-access setting,
allow the access to the management function via the respective one of the multiple input interfaces based on the authentication, in response to the set access setting for the respective one of the multiple input interfaces being the login-required setting, and
deny the access to the management function via the respective one of the multiple input interfaces irrespective of the authentication, in response to the set access setting for the respective one of the multiple input interfaces being the login-disabled setting.

2. The information processing apparatus according to claim 1, wherein the first input interface is configured to allow the access to the information processing apparatus when the administrator is physically present and the second input interface is configured to facilitate remote access to the information processing apparatus.

3. The information processing apparatus according to claim 2, wherein
the first input interface is the control panel provided to the information processing apparatus, and
the second input interface is a network interface that accepts the user instruction via a network.

4. The information processing apparatus according to claim 2,
wherein the management function provided by the information processing apparatus includes a first management function to allow an upper level administrator to register one or more lower level administrators,
the upper level administrator having an authority to register the one or more lower level administrators, each lower level administrator having an authority to operate the management function other than the first management function.

5. The information processing apparatus according to claim 1, wherein the circuitry is further configured to,
in response to detecting login to the information processing apparatus to access the management function via one of the multiple input interfaces, deactivate one or more of the multiple interfaces other than the input interface used for login, and
in response to detecting logout from the information processing apparatus via the input interface used for login, reactivate the deactivated other input interfaces.

6. The information processing apparatus according to claim 5,
wherein the management function provided by the information processing apparatus includes a first management function to allow an upper level administrator to register one or more lower level administrators,
the upper level administrator having an authority to register the one or more lower level administrators, each lower level administrator having an authority to operate the management function other than the first management function.

7. The information processing apparatus according to claim 1, wherein the circuitry is configured to,
accept a request to access the management function via one of the multiple input interfaces, and
determine, whether or not to allow access to the management function via the input interface used for inputting the request to access, based on the input associated with the respective one of the multiple input interfaces.

8. The information processing apparatus according to claim 7,
wherein the management function provided by the information processing apparatus includes a first management function to allow an upper level administrator to register one or more lower level administrators,
the upper level administrator having an authority to register the one or more lower level administrators,
each lower level administrator having an authority to operate the management function other than the first management function.

9. The information processing apparatus according to claim 1, wherein the management function provided by the information processing apparatus includes a first management function to allow an upper level administrator to register one or more lower level administrators,
the upper level administrator having an authority to register the one or more lower level administrators,
each lower level administrator having an authority to operate the management function other than the first management function.

10. A method of controlling access to a management function via multiple input interfaces provided on an information processing apparatus, the multiple input interfaces including a first input interface and a second input interface, the first input interface being a control panel, the second input interface configured to interface with a networked device, the method comprising:
displaying, on the control panel, an administrator login interface configuration screen such that the administrator login interface configuration screen simultaneously displays multiple access settings corresponding to each of the multiple input interfaces on a same screen, the multiple access settings including, for each of the multiple input interfaces, an open-access setting, a login-required setting, and a login-disabled setting,
determining, independently for each one of the multiple input interfaces, a set access setting from among the multiple access settings based on input received from an administrator in response to the multiple access settings for each of the multiple input interfaces simultaneously displayed on the same screen; and
controlling access to the management function independently via each of the multiple input interfaces based on the input independently selected for each of the multiple input interfaces by,
allowing the access to the management function via a respective one of the multiple input interfaces irrespective of authentication, in response to the set access setting for the respective one of the multiple input interfaces being the open-access setting,
allowing the access to the management function via the respective one of the multiple input interfaces based on the authentication, in response to the set access setting for the respective one of the multiple input interfaces being the login-required setting, and
denying the access to the management function via the respective one of the multiple input interfaces irrespective of the authentication, in response to the set access setting for the respective one of the multiple input interfaces being the login-disabled setting.

11. The method according to claim 10,
wherein the first input interface is configured to allow the access to the information processing apparatus when the administrator is physically present and the second input interface is configured to facilitate remote access to the information processing apparatus.

12. The method according to claim 11, wherein
the first input interface is the control panel provided to the information processing apparatus, and
the second input interface is a network interface that accepts a user instruction via a network.

13. A non-transitory computer-readable recording medium storing a program that, when executed by one or more processors, causes the processors to implement a method of controlling access to a management function via multiple input interfaces provided on an information processing apparatus, the multiple input interfaces including a first input interface and a second input interface, the first input interface being a control panel, the second input interface configured to interface with a networked device, the method comprising:
displaying, on the control panel, an administrator login interface configuration screen such that the administrator login interface configuration screen simultaneously displays multiple access settings corresponding to each of the multiple input interfaces on a same screen, the multiple access settings including, for each of the multiple input interfaces, an open-access setting, a login-required setting, and a login-disabled setting,
determining, independently for each of the multiple input interfaces, a set access setting from among the multiple access settings based on input received from an administrator in response to the multiple access settings for each of the multiple input interfaces simultaneously displayed on the same screen; and
controlling access to the management function independently via each of the multiple input interfaces based on the input independently selected for each of the multiple input interfaces by,
allowing the access to the management function via a respective one of the multiple input interfaces irrespective of authentication, in response to the set access setting for the respective one of the multiple input interfaces being the open-access setting,
allowing the access to the management function via the respective one of the multiple input interfaces based on the authentication, in response to the set access setting for the respective one of the multiple input interfaces being the login-required setting, and
denying the access to the management function via the respective one of the multiple input interfaces irrespective of the authentication, in response to the set access setting for the respective one of the multiple input interfaces being the login-disabled setting.

14. The non-transitory computer-readable recording medium according to claim 13, wherein-the first input interface is configured to allow the access to the information processing apparatus when the administrator is physically present and the second input interface is configured to facilitate remote access to the information processing apparatus.

15. The non-transitory computer-readable recording medium according to claim 14, wherein
   the first input interface is the control panel provided to the information processing apparatus, and
   the second input interface is a network interface that accepts a user instruction via a network.

* * * * *

UNITED STATES PATENT AND TRADEMARK OFFICE
CERTIFICATE OF CORRECTION

| | |
|---|---|
| PATENT NO. | : 10,484,362 B2 |
| APPLICATION NO. | : 15/345673 |
| DATED | : November 19, 2019 |
| INVENTOR(S) | : Hiroshi Kakii |

It is certified that error appears in the above-identified patent and that said Letters Patent is hereby corrected as shown below:

On the Title Page

(73) Assignee should read: Ricoh Company, Ltd., Tokyo (JP)

Signed and Sealed this
Twenty-first Day of April, 2020

Andrei Iancu
*Director of the United States Patent and Trademark Office*